July 4, 1950  B. E. O'CONNOR  2,514,136
CRANKSHAFT DAMPER
Filed Sept. 24, 1945  4 Sheets-Sheet 1
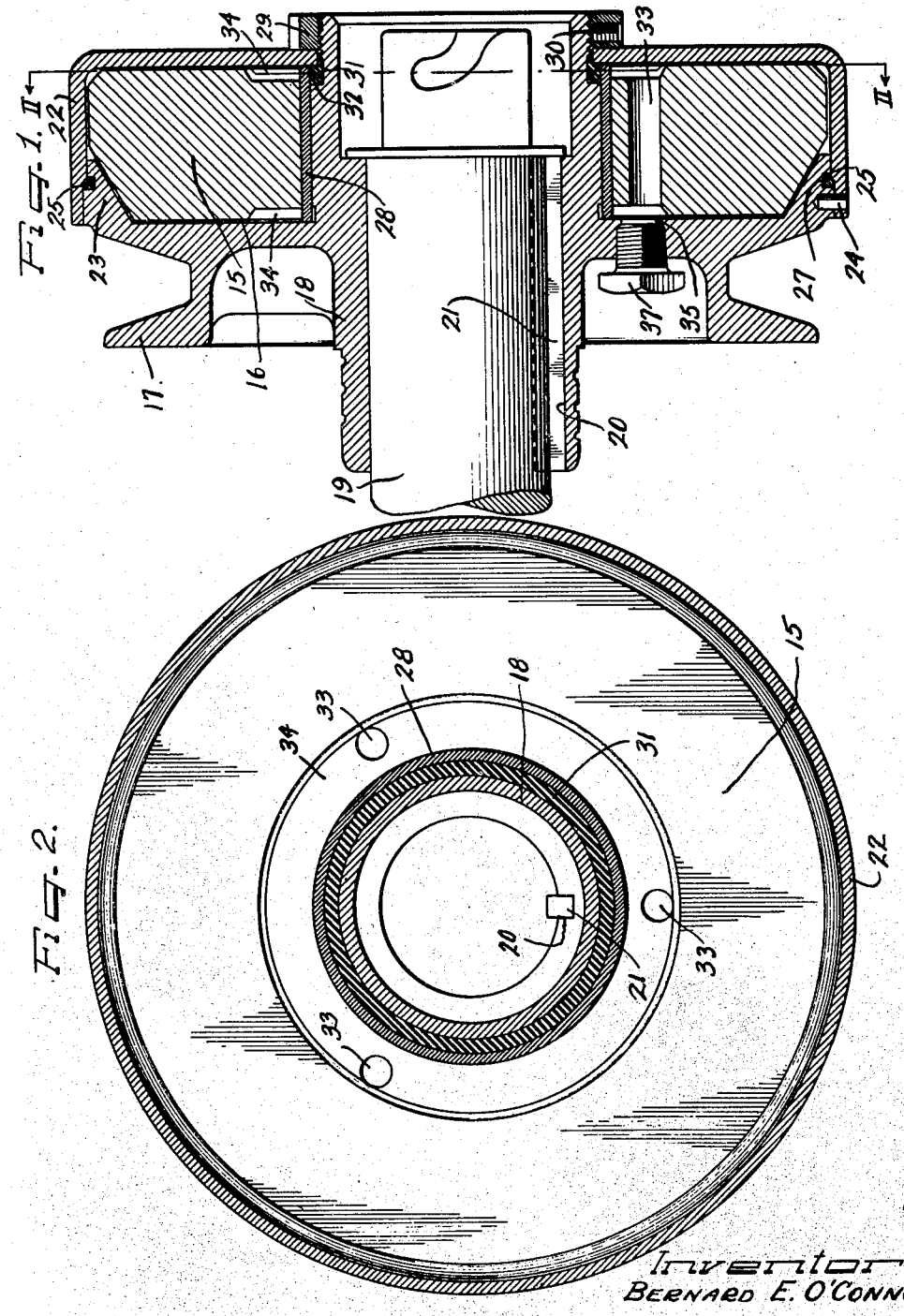
Inventor
BERNARD E. O'CONNOR

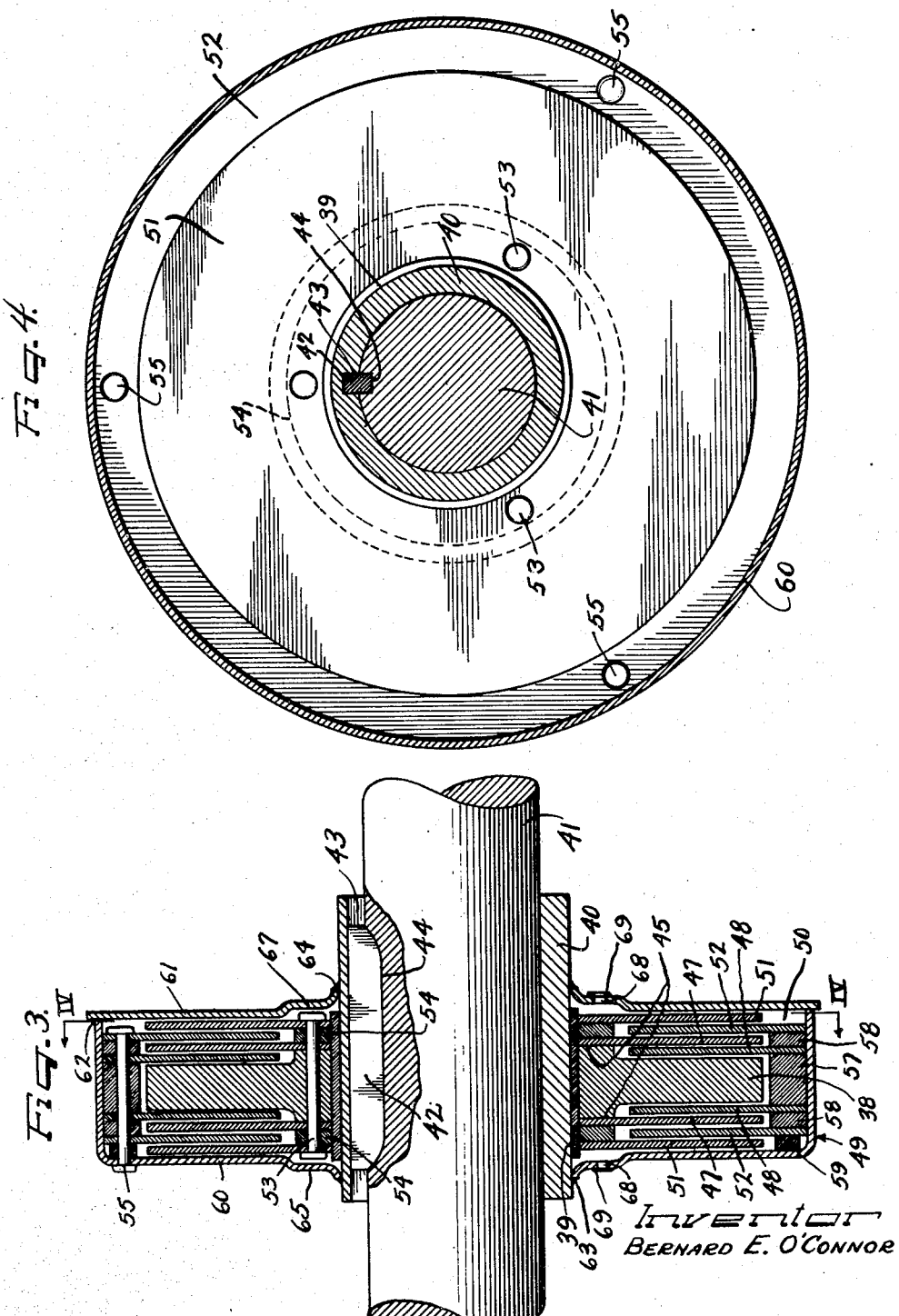

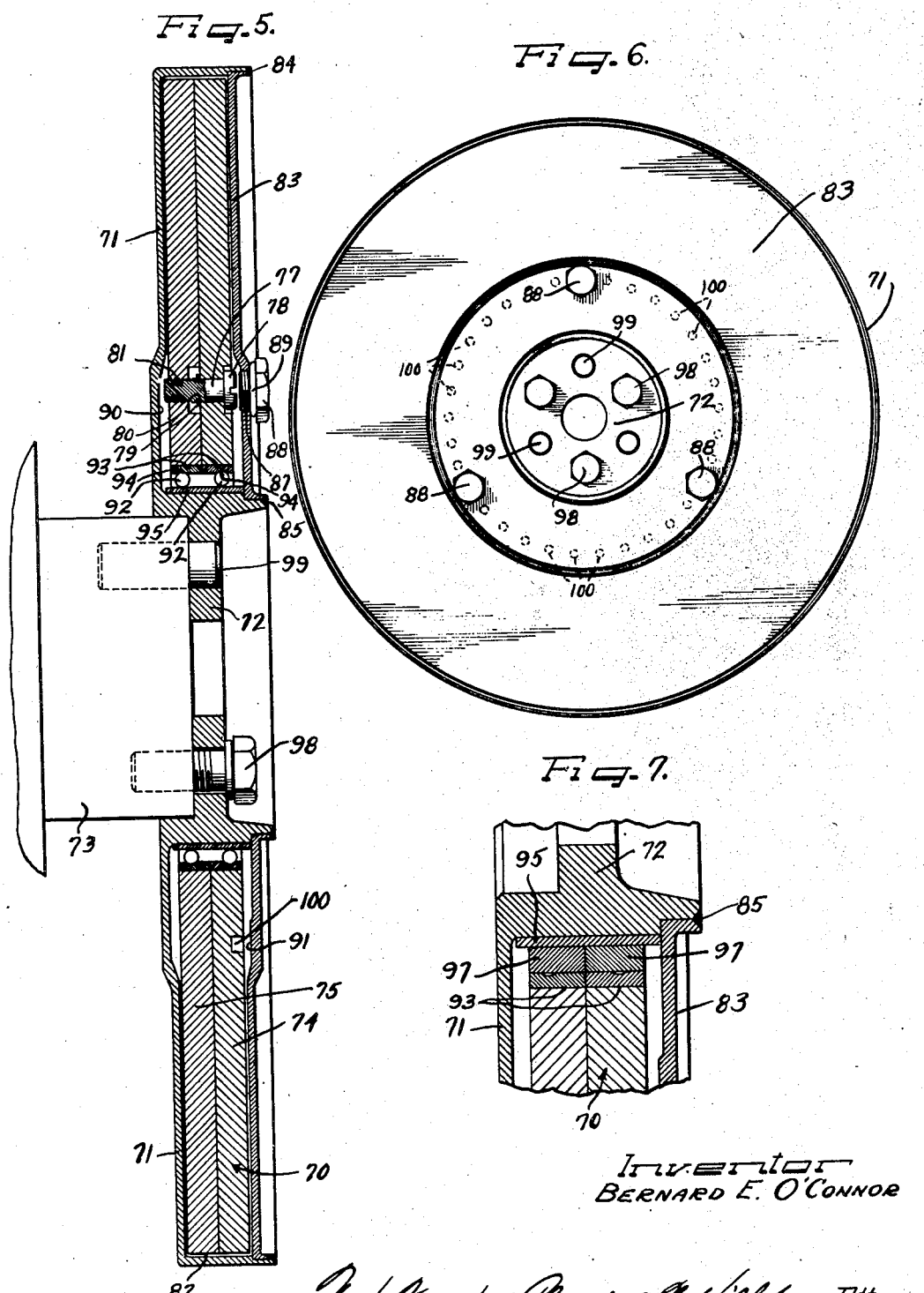

July 4, 1950 B. E. O'CONNOR 2,514,136
CRANKSHAFT DAMPER
Filed Sept. 24, 1945 4 Sheets-Sheet 4
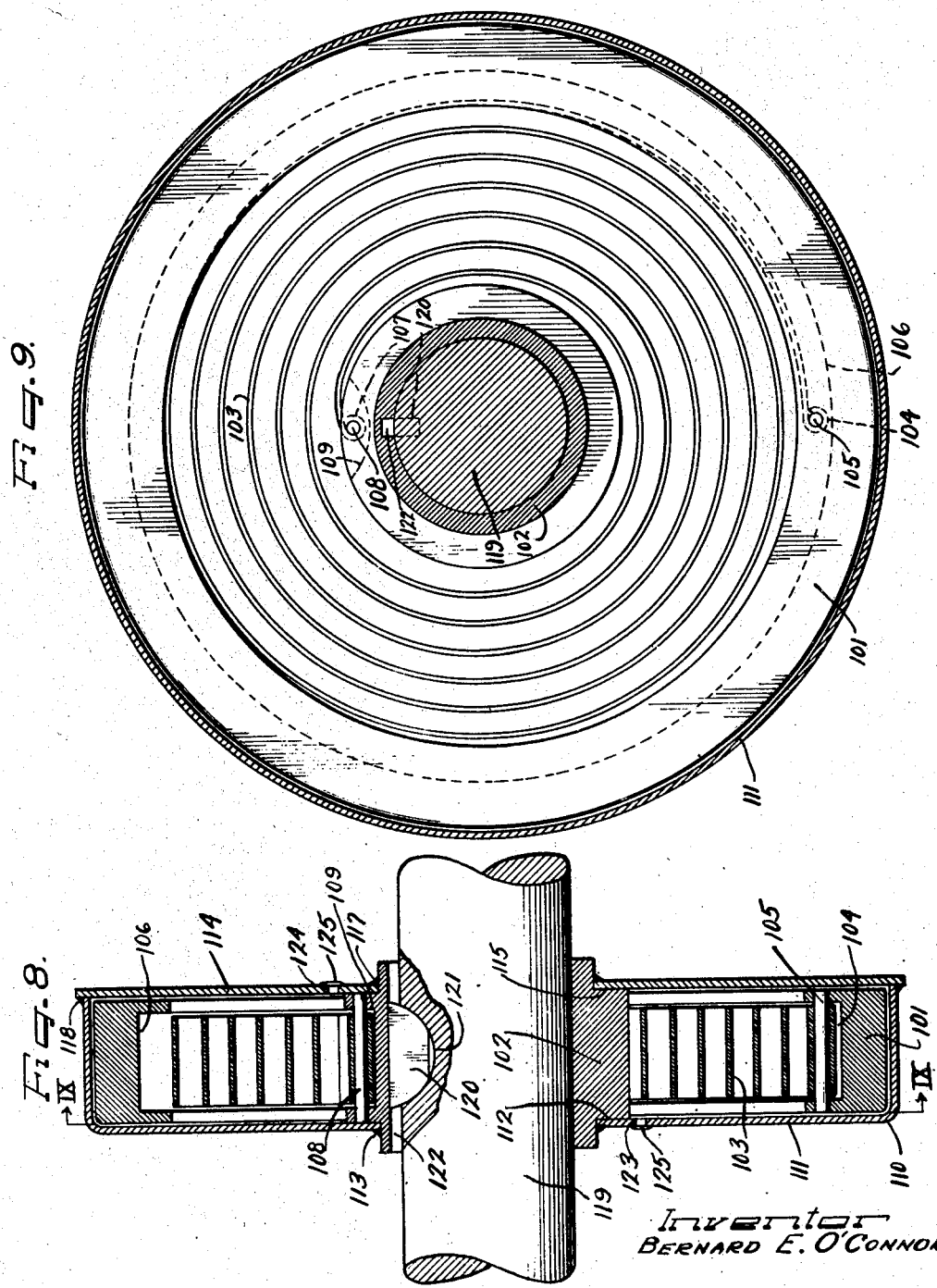
Inventor
BERNARD E. O'CONNOR Patented July 4, 1950

2,514,136

UNITED STATES PATENT OFFICE 2,514,136

CRANKSHAFT DAMPER

Bernard E. O'Connor, Buffalo, N. Y., assignor to Houdaille-Hershey Corporation, Detroit, Mich., a corporation of Michigan Application September 24, 1945, Serial No. 618,099

13 Claims. (Cl. 74—574)

This invention relates to improvements in vibration dampers and is more especially directed to overcoming the problem of torsional oscillations or vibrations in rotary masses such as the crankshafts of rotating machinery, of which internal combustion engines are a prime example, whereby to reduce or eliminate wear and noise and avoid fatigue failure which are resultants of such vibrations.

As is well known, of course, torsional oscillations or vibrations arise in rotary crankshafts from the application of driving energy thereto periodically as, for example, in piston operated machines such as certain steam engines and in internal combustion engines where gases expanding with explosive force are relied upon to drive pistons connected to the crankshafts. As the energy is released to such a crankshaft, there is a more or less severe torsional or twisting impact at the point of application of the energy tending to cause the immediately affected portion of the crankshaft to overrun the remainder of the shaft. This reacts in a torsional vibration throughout the shaft. At high frequency, such torsional vibration may, and often does, attain a disagreeable, damaging and very often dangerous amplitude. The greatest danger, as will be appreciated, resides in the ultimate fatigue failure of the vibrated member due to the torsional vibrations, although the damaging effects of the vibrations on associated mechanism may in most instances be the main reason for desiring to eliminate them.

Heretofore, it has been proposed to dampen torsional vibration by means of frictional devices. However, such frictional devices have certain inherent shortcomings among which may be mentioned rapidly declining efficiency due to wear, undue sensitivity to atmospheric changes, undesirable reaction to temperature changes, and the like.

An important object of the present invention is to avoid the use of frictional means for damping torsional oscillations or vibrations but instead to utilize the shear resistance of viscous fluids in overcoming the problem.

Another object is to obtain higher efficiency in crankshaft dampers.

Still another object of the invention is to provide a crankshaft damper which is free from efficiency losses due to wearing of parts and therefore at all times maintains peak efficiency.

A further object of the invention is to provide improved crankshaft dampers which remain substantially unaffected by atmospheric changes.

Yet another object of the invention is to provide crankshaft damping means which remain highly efficient throughout a wide temperature range that may be encountered in use, and more especially retain a high degree of operating efficiency at low temperatures although the optimum adjustment is established for a relatively higher normal operating temperature.

A still further object of the invention is to provide crankshaft damping means which are highly adaptable to meet various operational requirements.

An additional object is to provide an improved method of damping torsional oscillations or vibrations in crankshafts.

Other objects, features and advantages of the present invention will be readily apparent from the following description taken in connection with the accompanying drawings, in which:

Figure 1 is a diametrical sectional view through a crankshaft damper embodying features of the present invention;

Figure 2 is a vertical sectional view through the damper taken substantially along the line II—II of Figure 1;

Figure 3 is a diametrical sectional view through a modified form of the damper;

Figure 4 is a vertical sectional view taken on the line IV—IV of Figure 3;

Figure 5 is a diametrical sectional view of a further modified form of the crankshaft damper;

Figure 6 is a front elevational view, on a reduced scale, of the damper shown in Figure 5;

Figure 7 is a fragmentary diametrical sectional view on an enlarged scale through a slight modification of the damper shown in Figure 5;

Figure 8 is a diametrical sectional view through still another form of the crankshaft damper; and Figure 9 is a vertical sectional view taken substantially in the plane of line IX—IX of Figure 8.

Although several forms of torsional oscillation or vibration dampers according to the present invention for rotating machinery and particularly for shafts such as crankshafts have been shown and will hereinafter be described in detail, all forms have certain characteristics in common.

An important feature of the dampers resides in the use of a viscous fluid such as a silicone to resist relative motion between a damping inertia mass and a structure secured for rotation with a torsionally oscillating or vibrating mass such as a driven rotary shaft or crankshaft of a machine. More specifically, a flywheel is so disposed in spaced, relatively movable relation to a housing or to internal surfaces carried by the housing, that when the housing or such surfaces rotate with the torsionally oscillating mass such as a crankshaft a thin film of the viscous fluid intervening between the opposing working surfaces of or associated with the flywheel and the adjacent surfaces rotating with the shaft causes the flywheel to rotate with the shaft due to the inherent shear resistance of the viscous liquid. That is, the viscous fluid is present between the opposing parallel working surfaces of the flywheel and housing in films which are thicker than a mere lubricating film but which are of less thickness than a layer which will produce only a fluid drag relationship. Stated another way, the shear film of viscous fluid is the result of an essentially linear velocity gradient spacing between the opposing parallel working surfaces of the members with relation to the viscosity of the damping fluid rather than a non-linear velocity gradient relationship. As the shaft tends to oscillate or vibrate in operation the same characteristics of the viscous fluid which cause rotation of the flywheel with the shaft also resist the torsional oscillatory or vibrational movements of the shaft superimposed upon the normal rotation of the shaft. The force necessary to shear the viscous film between the flywheel surfaces and the adjacent work surfaces of the housing is proportional to the relative angular velocity between the flywheel and the housing work surfaces. The optimum proportion of the resistance of the viscous film to the moment of inertia of the flywheel is easily calculated for any specific installation.

In certain embodiments of the invention, instead of having the damping mass or flywheel relatively independently movably mounted in association with the mass subject to torsional oscillation and rotatable therewith entirely as a result of the shear resistance of the viscous fluid, the flywheel is torsionally connected to the main rotating and torsionally oscillatable mass. The inertia of the flywheel tending to resist torsional vibrations of the main mass is then harnessed to dampen the torsional vibrations through the medium of a film of the viscous fluid acting between the flywheel surfaces and closely adjacent working surfaces within the flywheel housing, and also through the resistance of a damper spring.

Having reference now to the form of the invention shown in Figures 1 and 2 and which has been especially devised for use with the crankshaft of an internal combustion engine such as an automobile, a flywheel 15 is relatively rotatably and axially movably mounted within a chamber 16 provided by a housing formed in part by a fan belt pulley 17 which includes a hub 18 adapted to be mounted upon the outer end portion of a crankshaft 19. The hub 18 is formed to extend substantially to opposite sides of the flywheel 15 and is provided with means such as a key slot 20 to receive a key 21 to maintain the hub for joint rotation with the shaft 19. A substantially cup-shaped shell 22 provides a closure for the chamber 16 and completes the flywheel housing. The shell 22 has its margin in smug embracing engagement with an outer marginal flange 23 extending axially from the adjacent front side of the pulley 17. Means for securing the shell in place on the flange 23 may comprise a circumferentially spaced series of pins or stakes 24. A fluid-seal is provided by packing 25 carried within a groove 27 in the shell-opposing face of the flange 23.

A bearing for rotation of the flywheel 15 about the forwardly projecting end portion of the hub 18 is provided by a bushing 28, which is secured in assembly by the adjacent wall of the housing shell 22 driven axially thereagainst by means of a nut 29 threaded about the protruding forward end of the hub 18 and is prevented from loosening by means such as a set screw 30. A liquid-tight seal is provided by packing 31 disposed within an annular groove 32 in the hub at the juncture of the cover 22 and the bushing 28.

The interior of the chamber 16 is so proportioned with respect to the dimensions of the flywheel 15 that only a very narrow spacing persists between the surfaces of the flywheel at its periphery and axial sides and the opposing work surfaces of the housing. Such spaces are filled with a viscous fluid such as a selected silicone, a commercial example of which may be identified as Dow-Corning fluid No. 200, having a viscosity rating of approximately 30,000 centistokes at 77° F. For the best results it is recommended that the chamber 16 be filled at a temperature of approximately 200 to 250° F. A good working clearance for such a fluid is approximately $1/64$ of an inch between the surfaces of the flywheel 15 and the working surfaces of the housing within the chamber 16. To obtain uniformity of distribution of the viscous fluid for providing a uniform viscous film over the flywheel, a balanced plurality of axially extending liquid distribution holes 33 may be provided to extend through the flywheel 15 adjacent to its inner or hub periphery and communicating with similar fluid distribution annular rabbet grooves 34 in the opposite hub margins of the flywheel. Communicating with the fluid distribution system provided by the holes 33 and the grooves 34 is a filling opening 35, preferably formed in the web of the pulley wheel 17 and closed by a screw plug 37.

In operation, the hub 18 and thus the flywheel housing rotates with the shaft 19 and is thereby also subject to any torsional vibrations or oscillation of the shaft. The only driving connection between the flywheel 15 and the hub 18 is through the medium of the film of viscous fluid acting between the surfaces of the fly wheel 15 and the working surfaces within the chamber 16. This fluid driving connection more or less gradually induces the flywheel to rotate at the speed of the shaft 19, centrifugal force driving the viscous fluid uniformly throughout the working clearances between the flywheel and the housing. The inertia of the flywheel causes it to resist sudden variations in rotary momentum such as are the result of torsional oscillations or vibrations. This resistance is transmitted through the viscous fluid film and the walls of the housing within the chamber 16 to the hub 18 and thereby to the shaft 19. As a result, the torsional vibrations or oscillations are dampened and prevented from having any deleterious effect upon either the shaft or associated mechanism. Due to the freedom of axial movement of the flywheel 15, the centrifugal pressure of the viscous damping fluid working in the axial spaces between the flywheel and the housing causes the flywheel during operation to assume an equalized or self-centered position within the chamber 16 so that the axial spaces are as nearly perfectly uniform as practicable.

Where the magnitude of the torsional vibrations or oscillations is such as to require greater damping resistance than afforded by the working surface area provided by the damper disclosed in Figures 1 and 2, a modified version such as shown in Figures 3 and 4 may be employed wherein the working area upon which the viscous damping fluid is operative is greatly extended by the provision of means such as interleaved disks. In this form of the damper, a flywheel 38 has in preferably fixed, such as press fitted assembly therewith a bearing bushing 39 which is axially slidable and freely rotatable about a hub 40. The latter is adapted to be carried by a shaft 41 subject to rotary oscillation or vibration superimposed upon it at normal operating speeds. A connection for joint rotation of the shaft and hub may be effected through the medium of a key 42 located in keying slots 43 and 44 in the hub and the shaft, respectively.

The flywheel 38 is formed with annular spacer shoulders 45 at its opposite axial sides adjacent the hub for maintaining surface-extending coaxial disks 47 in spaced relation thereto sufficient to accommodate in closely spaced relation therebetween disks 48 which are mounted fast within an enclosing housing 49 which provides a chamber 50 within which the flywheel 38 and the associated disks are disposed. The mass of the flywheel 38 may, of course, be as great or as small as desired and the disks 47 and 48 may be as thick or as thin and of such diameter as the particular circumstances warrant and their spacing with respect to each other and to the flywheel 38 may be appropriately adjusted with regard to the operating conditions to be encountered in use and the viscosity characteristics of the damping fluid within the chamber 50. Furthermore, the number of interleaved disks may be as great as would seem to be warranted for the damping action required.

As shown, an additional pair of outer flywheel disks 51 is provided to cooperate with an additional pair of housing disks 52. The outer flywheel disks 51 also cooperate in damping relation with the axial walls of the housing 49. Means for securing the flywheel disks 47 and 51 for joint rotation with the flywheel 38 may, as shown, comprise rivets 53 extending through the disks and the hub portion of the flywheel at the spacer shoulders 45 in equidistantly annularly spaced relation, with appropriate spacers such as rings 54 interposed between the inner disks 47 and the outer disks 51, and all being clamped solidly together by the rivets. Similarly, the housing disks 48 and 52 are clamped tightly into position and torsionally rigid with the housing 49 by an equidistantly annularly spaced series of rivets 55, spacers 57, 58 and 59 maintaining the preferred spacing between respectively the opposed faces of the spaced disks 48, the opposing faces of the disks 48 and 52, and the opposing surfaces of the disks 52 and the axial side walls of the housing 49 to which the disk mass is secured by the rivets 55.

In a simple construction, the housing 49 may comprise a two-part structure including a substantially cup-shaped member 60, providing an axial and the circumferential wall of the housing, and a closure disk 61 providing the opposite axial side wall of the housing. They are secured together where the annular wall of the housing member 60 contacts the closure disk 61 edgewise, as by welding 62, to provide a fluid-tight juncture. A fluid-tight and torsionally solid conection with the hub 40 is attained for the housing 49 by means such as welding 63 and welding 64 of the inner edges of the housing members 60 and 61, respectively, where they engage the hub.

As nearly as practicable, all of the chamber space 50 within the housing 49 is filled with a viscous damping fluid so as to provide a viscous film between all of the opposed relatively movable surfaces of the damper. To accommodate the filling operation, and also to provide clearance for the heads of the flywheel rivets 53, the chamber members 60 and 61 are preferably formed with substantial off-set clearances 65 and 67, respectively, adjacent to the hub 40. This provides a system of liquid distribution channels interiorly of the chamber. Each of the offsets 65 and 67 is preferably provided with an opening 68, one of which will serve as a filler opening during filling of the chamber 50, while the other opening 68 serves as an air vent during the same operation. After the chamber 49 has been filled with the viscous liquid, the openings 68 may be closed with fluid-sealing means such as respective solder seals 69.

As will now be apparent, the torsional vibration or oscillation damper of Figure 3 provides substantially multiplied area subject to the shear resistance of the viscous fluid therein so that the vibration or oscillation damping action of the flywheel 38 is rendered quite strong and positive in action. The mass of the flywheel 38 as well as the area thereof exposed to the viscous fluid film, and also the number, size and effective areas of the co-operating disks can be conveniently calculated and constructed to meet any reasonable practical requirements. It may also be noted that in this form of the invention, similarly as in the form of the invention shown in Figures 1 and 2, the flywheel is self-aligning in operation due to the centrifugal force of the viscous fluid. It is therefore practical to allow the same free floating action of the flywheel axially within the housing 49, with the attendant advantages in manufacturing tolerances in the various co-operating parts.

Some forms of rotating machinery, as for example, certain steam operated or Diesel operated machines having relatively heavy crankshafts, require large, heavy duty dampers. Actual operating conditions may, however, present problems of inertia, momentum and torsional stresses and involve variable factors in operation which cannot be wholly anticipated in designing a vibration damping member such as the forms shown in Figures 1 to 3. In particular, since the motion of the main mass which is to be dampened can be transferred to the flywheel only by means of the viscous fluid medium, due to the relatively free floating mounting of the flywheel within its housing, individual adjustments may be required in connection with individual machines in order to secure greater or less resistance between the vibration-damping flywheel mass and the working surfaces rotating with the main mass. The motion of the flywheel mass with respect to the motion of the main mass is, of course, proportional to the power of resistance to motion of the viscous film between the flywheel and the working surfaces, and inversely proportional to the inertia of the flywheel. Therefore, a greater shear resistance in the viscous film between the relatively movable surfaces in the damper will result, up to certain limits, from reducing the spacing between the working surfaces, this having the effect of reducing the thickness and increasing the tenacity of the film. On the other hand, it may be necessary under certain conditions to increase the working space or clearance between the surfaces and thus release the flywheel for somewhat freer movement.

An adjustable damper which is particularly suitable for the purposes just mentioned is shown in Figures 5 and 6 wherein a flywheel 70 is jointly and independently rotatable within a housing 71. A hub 72 on the housing is adapted to be secured to the end of the shaft 73 which is of relatively large diameter and great mass. In this instance, both the flywheel 70 and the housing 71 are of relatively large diameter and substantially flat, disklike construction affording large cooperative working surfaces for the action of the viscous film therein.

In order to adapt the flywheel 70 for adjustment with respect to the spacing of the flywheel surfaces from at least the major side wall cooperating working surfaces of the housing 71, the flywheel is formed in two relatively adjustable sections, herein comprising similar flywheel disks 74 and 75 which are normally cooperable in face-to-face relationship and can be axially adjusted to increase the over-all width of the flywheel. For effecting such adjustment there are provided adjusting screws 77, herein three in number disposed in equidistantly spaced balanced annular series, which are carried rotatably but not axially shiftable adjacent to the hub of the device by one of the disks, herein the disk 74. The screws 77 have adjustable threaded engagement with the other disk 75 so that by turning the screws 77 the disks can be drawn tightly together or spread apart as required. The screws 77 are held against axial movement relative to the disk 74 by slotted heads 78 thereon and cooperating snap rings 79 fitting in axial grooves 80 formed in the shanks of the screws in proper spaced relation to the heads 78 to receive the intervening thickness of the carrying disk 74. Turning of the screws 77 out of adjustment is prevented by means such as fiber locking rings 81 carried by the respective screws adjacent to their terminal ends. It will be clear, of course, that the screws 77 hold the disks 74 and 75 against relative rotation.

By preference, the housing 71 and the hub 72 are formed integrally as a casting providing an annular chamber 82 within which the flywheel 70 is closely accommodated and which in the casting is open at one side but is closed in the operative assembly by a cover 83. The latter may be formed to internest snugly with an axially projecting marginal portion of the peripheral wall of the housing 71 and is secured in a tight, rigid joint therewith as by welding 84. The cover is similarly associated and secured to the cooperating portion of the hub 72 and sealed as by welding 85. Adjustment access to the screws 77 is provided for through appropriately dimensioned and located openings 87 in the closure wall 83 and which openings are closed by screw plugs 88 effecting a fluid-tight seal through the medium of respective sealing washers 89.

Viscous damping liquid may be introduced into the chamber 82 through any selected one of the access openings 87. The filling of liquid into the chamber 82 is facilitated by relatively equally opposite axial extensions of the chamber 82 adjacent to the hub 72 as provided by channel offsets 90 and 91 in respectively the hub part of the side wall of the housing 71 and the hub part of the cover wall 83. The fluid channels 90 and 91 also accommodate any protruding portions of the adjustment screws 77 within the fluid chamber.

Free relative rotation of the flywheel 70 and the housing 71 is facilitated by providing anti-friction means such as bearing balls 92 between the inner diameters of the flywheel disks 74 and 75 and the hub 72. Accordingly, the disks 74 and 75 may be provided with individual bearing races 93 and the bearing balls 92 may be of relatively small size running in respective grooves 94 in the flywheel races 93 but running on a common cylindrical race 95 on the hub 72. This permits free axial adjustment of the flywheel halves 74 and 75 and bodily axial movement of the flywheel 70 for alignment and self-centering of the flywheel within the chamber 82 under the centrifugal action of the viscous fluid during operation. It may also be noted that the space between the bearing races 93 and 95 affords fluid communication between the channels 90 and 91.

Where preferred, ring bearings 97 may be substituted, as shown in Figure 7, for the ball bearings 92.

Removable attachment of the hub 72 to the end of the shaft 73 may be effected through the medium of bolts 98. For quick attachment purposes the bolts 98 should be as few in number as practicable, and yet there must be a high degree of torsional strain resistance in the connection with the shaft for obvious reasons. Accordingly, there may be three of the bolts 98 equidistantly annularly spaced as shown in Figure 6, alternating with close fitting pins 99. A quick-detachable relationship of the damper and the shaft 73 is particularly desirable in order to permit removal of the member for adjustment purposes after it has been tried out on the shaft 73 and the desirability of adjustment determined. For this purpose it is a relatively simple matter to remove the three attaching screws 98, and slip the pins 99 out of their sockets. The damper is then laid on its side with the access openings 87 up, and the closure plugs 88 are removed to expose the adjusting screws 78. Should the adjusting screws 78 be out of register with the access openings 87, the flywheel 70 can easily be turned until registration is effected, by means of a suitable tool such as a screw driver or the like inserted through any of the access openings and received in a leverage pit 100. A uniform annular series of the leverage pits 100 may be provided in the flywheel disk 74 between each pair of adjusting screws 78. After appropriate adjustments have been made to increase or decrease the effective spacing between the inner side walls of the flywheel disks 74 and 75 and the opposing working surfaces of the housing 71 and the closure wall 83, reassembly of the damper into working order with the shaft 73 can be rapidly effected by re-registration of the pins 95 and replacing the attaching screws 98.

Up to this point the various forms of torsional vibration or oscillation dampers described have been of the more or less free running type in that the flywheel in each instance has been free to rotate relative to its housing and therefore relative to the associated shaft except for the viscous connection afforded by the viscous liquid working between the closely spaced surfaces provided for this purpose.

However, the invention also contemplates the provision of what may be termed as a tuned damper in which a flexible or torsional mechanical connection is effected between the flywheel structure and the vibrating mass through the medium of the hub by which the damper is connected to the vibrating mass. As a result of such connection, the vibrations or torsional oscillations of the main mass, such as the driven rotary shaft of a machine, are imparted, more or less, to the flywheel which is thus also vibrated or oscillated. But due to the great difference in the respective masses, the flywheel will tend to vibrate or oscillate at a different amplitude which is out of phase with the amplitude of vibration or oscillation of the main vibrating mass. Therefore, there is a tendency towards relative motion of the flywheel and the main mass which, when resisted by the viscous film intervening between the active surface of the flywheel and opposing working surfaces within the flywheel housing, has the effect of counteracting and dampening the vibration or oscillation in the main mass. A tuned damper is actually much more efficient than a free running damper when used for the same purpose, but must be especially designed for each application to which it is to be put. This does not mean, of course, that each damper must be individually designed, but that for each type of rotary mass to be damped and having a known frequency of amplitude of torsional vibration or oscillation, a damper must be endowed with special frequency responses which will cause it to function as desired for that particular practical application. That is, the proportions of the flywheel and its resilient connection must be such that the flywheel has a natural frequency somewhat lower than the natural frequency of the main mass. In this manner, when the frequency of the exciting force in the main mass approaches the natural frequency of the main mass and the damper combination, the damper flywheel vibrates with an amplitude which is large in proportion to the amplitude of vibration of the main mass and energy is then absorbed due to the relative motion between the flywheel and the housing which is overcome by the resisting force of the viscous film.

In one form of the tuned torsional damper, as shown in Figures 8 and 9, a ring-type of flywheel 101 of substantially greater internal diameter than a hub 102 is connected to the hub concentrically through the medium of a coiled torsion spring 103. The spring 103 is in the nature of an untensioned or open clock spring having its outer end formed with a connecting loop 104 by which it is connected through the medium of a pin 105 to the flywheel 101 within an annular radial groove 106. The inner end of the spring 103 is formed with a loop 107 by which it is connected as by means of a pin 108 within a peripheral recess 109 provided therefor in the hub 102. With this arrangement, it will be obvious that relative rotational movement of the flywheel 101 and hub 102 is permitted within certain limits by flexure of the coil spring 103 but that the tendency of the spring 103 is at all times to return to the normal or neutral relative position of the flywheel and hub. As a result, while steady rotation in one direction of the hub 102 will cause the flywheel 101 to rotate therewith due to the connection afforded by the spring 103, any variations in speed such as accompany torsional vibration or oscillation are resisted by the flywheel. Such resistance is transmitted to a certain extent to the hub 102 through the torsion spring 103. If the flywheel 101 were allowed to operate freely and in the clear, a continuous frequency of vibration or oscillation in the hub 102 would tend through the spring 103 to generate a sympathetic vibration or oscillation in the flywheel 101. However, the flywheel 101 is enclosed within a housing 110 which is rigid with the hub 102 and closely approaches all adjacent surfaces of the flywheel 101. The spaces between the flywheel and the housing are filled with a viscous damping fluid to provide a continuous viscous film on and between the closely approaching surfaces. Therefore all tendency during operation toward relative oscillaton of the flywheel 101 and the hub 102 is strongly resisted by the viscous film. As a result, torsional oscillation or vibration in the hub 102 is effectively dampened.

An economical construction for the housing 110 comprises a two-part structure including a substantially cup-shaped shell 111 which provides one side and the peripheral wall of the housing and is secured to the hub 102 within a rabbet groove 112 in the latter. A fluid-tight and torsionally solid junction between the shell 111 and the hub is effected as by means of welding 113. The opposite wall of the housing 110 comprises a closure wall plate 114 interfitting with the hub 102 in a rabbet groove 115 at the opposite end of the hub and rigidly secured in fluid-tight relation to the hub as by means of welding 117. A rigid, fluid-tight connection of the closure wall 114 with the peripheral wall of the cup-shaped member 111 may be effected as by means of welding at 118.

The hub 102 is adapted to be fixedly attached to a shaft 119 in which the vibrations or torsional oscillations are to be dampened, as by means of a keyed connection including a key 120 received within a slot 121 in the shaft and an axial groove 122 within the inner periphery of the hub.

Space for an ample supply of viscous fluid within the housing 110 is afforded by the chamber area between the flywheel 101 and the hub 102 within which the torsion spring 103 occupies only a fraction of the total and because of its open nature permits free distribution of fluid throughout the chamber. Communicating with such chamber area is a pair of small openings 123 and 124 preferably respectively in the housing shell 111 and in the cover wall 114, and both adjacent to the hub 102. One of these openings may actually receive the fluid therethrough and the other serve as a vent opening. After the damper has been filled both of the openings 123 and 124 are sealed by such means as a solder seal 125.

From the foregoing it will be apparent that the present invention provides an admirably simple, compact and efficient type of vibration or oscillation damper for a torsional member subject to rotary vibrations or oscillations during operation and which, because of the relatively movable relationship of the stabilizing means or flywheel is practically free from all frictional contact with associated parts and is actually maintained in spaced relation with such parts, as for example the walls of the enclosing housing. Further, a constantly lubricated relationship is afforded by the viscous fluid which forms the relative motion resisting film between the working surfaces of the parts. Thus, the structure is entirely free from any possibility of wear. This assures complete efficiency in performance at all times. Furthermore, by proper selection of the viscous damping fluid very little, and for the most part inconsequential, variation in efficiency will be encountered due to temperature variations. For example, it has been found that by the use of a silicone fluid a damper of the present invention adapted for 100% efficiency at 160° F. will be more than 75% efficient at 0° F.

In addition, provision is made for effecting desirable adjustments to accommodate special working conditions. Even though the rotating mass to be controlled is subject to a plurality of modes of vibration or torsional oscillation, the present invention provides for effectively damping the same.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a torsional vibration or oscillation damper of the character described, a housing adapted for joint rotation with a rotary mass subject to torsional vibrations or oscillations, a flywheel structure within said housing, said housing and said flywheel structure presenting closely adjacent working surfaces adapted to have a damping fluid transmission operative thereon, said housing structure and said flywheel structure being relatively adjustable to vary the spacing between at least certain of the opposed working surfaces, and means including a plurality of screws for maintaining the adjusted condition.

2. A torsional vibration and oscillation damper of the character described comprising a housing structure and a flywheel structure operative within said housing structure, said flywheel structure and said housing structure being provided with opposed spaced working surfaces adapted to have a fluid medium operable therebetween said flywheel structure comprising parts which are relatively adjustable to vary the spacing between said working surfaces, and means for holding said parts in various adjusted relationships.

3. In combination, in a torsional vibration damper structure, means providing a fluid-tight flywheel housing, a flywheel freely rotatably and axially movable within said housing, said housing and the flywheel having opposing axially facing working surfaces spaced approximately 1/64th inch apart in operation, and viscous coupling fluid in said housing operative in the rotation of the housing to effect a viscous shear film coupling between said working surfaces and maintaining the surfaces out of contact.

4. The method of damping the torsional vibrations or oscillations of a crankshaft which comprises rotating fixedly with the shaft a housing having therein a viscous damping fluid and a flywheel structure which has working surfaces thereof in such closely spaced relation to the opposing working surfaces within said housing as to accommodate but a shear film of the viscous fluid and which is relatively rotatable and axially movable within the housing, and centrifugally driving the viscous damping fluid in the rotation of the housing into said shear film spaces between the working surfaces of the flywheel and the housing to provide a compression and shear resistant film of the fluid between said opposed surfaces for effecting joint rotation of the flywheel and housing and maintaining the spacing between said opposed surfaces as well as resisting relative torsional vibrations or oscillations transmitted to the housing from the crankshaft.

5. A torsional vibration and oscillation damper of the character described comprising a housing structure and a flywheel structure operative within said housing structure, said flywheel structure and said housing structure being provided with opposed working surfaces adapted to be spaced slightly apart and to have a fluid coupling medium operable therebetween, said flywheel structure being adjustable to vary said spacing between said working surfaces, said flywheel structure being movable within said housing structure normal to said surfaces and thereby tending to close the spacing between said surfaces, said spacing being adapted to be maintained in any adjusted condition of the flywheel in operation and the flywheel coupled for joint rotation with the housing structure by the fluid medium between said working surfaces.

6. In combination, in a torsional vibration or oscillation damper of the character described, especially adapted for heavy duty purposes, a housing having a hub structure adapting it to be secured to a Diesel engine crankshaft or the like, said housing affording a narrow space of relatively large diameter therein and having spaced opposing axially facing working surfaces and a relatively narrow peripheral working surface, and a flywheel structure relatively rotatably mounted within said housing and having axially facing working surfaces opposing said axially facing housing surfaces in closely spaced relationship and adapted to have a viscous fluid coupling medium operative therebetween, said flywheel structure also having a peripheral surface opposing the peripheral working surface of the housing, the total effective opposing working area of each of the axially facing working surfaces of the housing and the flywheel structure being substantially in excess of the peripheral area of the flywheel structure whereby the principal coupling effect of the fluid medium is effective between the respective opposing axially facing working surfaces of the housing and flywheel structure.

7. In combination, in a torsional vibration or oscillation damper of the character described, especially adapted for heavy duty purposes, a housing having a hub structure adapting it to be secured to a Diesel engine crankshaft or the like, said housing affording a narrow space of relatively large diameter therein and having spaced opposing axially facing working surfaces and a relatively narrow peripheral working surface, and a flywheel structure relatively rotatably mounted within said housing and having axially facing working surfaces opposing said axially facing housing surfaces in closely spaced relationship and adapted to have a viscous and compression resistant fluid coupling medium operative therebetween, said flywheel structure also having a peripheral surface opposing the peripheral working surface of the housing, the area of each of the axially facing working surfaces of the housing being substantially in excess of the peripheral area of the flywheel structure whereby the principal coupling effect of the fluid medium is effective between the respective opposing axially facing surfaces of the housing and flywheel structure, said flywheel structure being free for movement axially within the housing and being adapted to be maintained in spaced relation to the axially facing housing working surfaces in operation by the compression resistance of the fluid medium.

8. In combination, in a torsional vibration or oscillation damper of the character described, especially adapted for heavy duty purposes, a housing having a hub structure adapting it to be secured to a Diesel engine crankshaft or the like, said housing affording a narrow space of relatively large diameter therein and having spaced opposing axially facing working surfaces and a relatively narrow peripheral working surface, and a flywheel structure relatively rotatably mounted within said housing and having axially facing working surfaces opposing said axially facing housing surfaces in closely spaced relationship and adapted to have a viscous fluid coupling medium operative therebetween, said flywheel structure also having a peripheral surface opposing the peripheral working surface of the housing, the area of each of the axially facing working surfaces of the housing being substantially in excess of the peripheral area of the flywheel structure whereby the principal coupling effect of the fluid medium is effective between the respective opposing axially facing working surfaces of the housing and flywheel structure, said flywheel structure comprising separable portions axially adjustable to vary the width of the flywheel structure and thereby the spacing of the axially facing working surfaces of the flywheel structure from the opposing axially facing surfaces of the housing.

9. In combination in a vibration damper, a housing structure providing a fluid-tight chamber, an inertia mass structure housed within said chamber and relatively movable therein, and a viscous damping fluid within the housing, said housing structure and said inertia mass structure having opposed parallel working surfaces which are in essentially linear velocity gradient spacing relative to the viscosity of the damping fluid and have a shear film of the fluid therebetween, such shear film being thicker than a mere lubricating film but being of less thickness than a layer of the fluid which would afford only a non-linear velocity gradient relationship, said shear film of the fluid acting between said working surfaces to resist relative parallel movement thereof.

10. In combination in a vibration damper, a housing structure providing a fluid-tight chamber, an inertia mass structure housed within said chamber and relatively movable therein, and a viscous damping fluid comprising a silicone between said inertia mass structure and the housing structure, said housing structure and said inertia mass structure having opposed parallel working surfaces spaced apart sufficiently to avoid mechanical bearing of said surfaces but close enough together to limit the silicone fluid to a shear film operative to resist relative parallel vibratory movement between said working surfaces.

11. In combination in a vibration damper of the character described, a housing having a hub adapted to be attached to a mass to be damped such as a crankshaft and to rotate concentrically therewith, a flywheel concentrically rotatable and axially movably disposed within said housing, and a viscous damping fluid within said housing between the flywheel and the housing, said flywheel and said housing having axially facing surfaces in opposing relation and in operation being spaced out of bearing relation but being so close together as to limit the damping fluid to but a shear film therebetween, the damping fluid under centrifugal force in operation entering between said opposed surfaces and maintaining the shear film spacing therebetween to a uniform thickness at both sides of the flywheel and resisting relative torsional displacement of the flywheel and the housing by shear resistance.

12. In combination in a vibration damper, a housing structure providing a fluid-tight chamber and having a plurality of spaced parallel disks extending into said chamber, an inertia mass structure housed within said chamber and relatively movable therein, said inertia mass structure having a plurality of spaced parallel disks thereon interleaved with the disks of the housing structure, and a viscous damping fluid within the chamber, said housing structure and said inertia mass structure and the interleaved disks having opposed parallel working surfaces which are in essentially linear velocity gradient spacing relative to the viscosity of the damping fluid and having a shear film of the fluid therebetween, such shear film being thicker than a mere lubricating film but being of less thickness than a layer of the fluid which would afford only a non-linear velocity gradient relationship, said shear film of the fluid acting between said working surfaces to resist relative parallel movement thereof.

13. In combination in a vibration damper, a housing structure providing a fluid-tight chamber, an inertia mass structure housed within said chamber and relatively movable therein, a viscous damping fluid within the housing, said housing structure and said inertia mass structure having opposed parallel working surfaces which are in essentially linear velocity gradient spacing relative to the viscosity of the damping fluid and have a shear film of the liquid therebetween, such shear film being thicker than a mere lubricating film but being of less thickness than a layer of the fluid which would afford only a non-linear velocity gradient relationship, said shear film of the fluid acting between said working surfaces to resist relative parallel movement thereof, said housing structure including a hub, said inertia mass structure being of annular form and of substantially greater internal diameter than the diameter of the hub so as to leave a substantial space therebetween, and a spiral spring disposed around said hub and having its inner end connected to the hub and its outer end connected to the inertia mass structure to provide a resilient connection between the housing structure and the inertia mass structure acting to resist relative movements of the housing and inertia mass structures in addition to the resistance to movement aforesaid of the viscous damping fluid.

BERNARD E. O'CONNOR.

REFERENCES CITED

The following references are of record in the file of this patent:

UNITED STATES PATENTS

| Number | Name | Date |
| --- | --- | --- |
| 1,718,207 | Anibal | June 25, 1929 |
| 1,719,805 | Hammond | July 2, 1929 |
| 1,830,600 | Fifield | Nov. 3, 1931 |
| 1,928,119 | Vargha | Sept. 26, 1933 |
| 1,962,367 | Smythe | June 12, 1934 |
| 2,002,699 | Larsen | May 28, 1935 |
| 2,013,109 | Reynolds | Sept. 3, 1935 |
| 2,062,369 | Meyer | Dec. 1, 1936 |
| 2,080,279 | Kellogg | May 11, 1937 |
| 2,264,694 | Griffith | Dec. 2, 1941 |
| 2,361,266 | Clark | Oct. 24, 1944 |

FOREIGN PATENTS

| Number | Country | Date |
| --- | --- | --- |
| 337,466 | Great Britain | May 20, 1930 |
| 349,906 | Great Britain | May 26, 1931 |
| 508,513 | Great Britain | July 3, 1939 |